United States Patent
Huang et al.

(10) Patent No.: US 10,575,254 B2
(45) Date of Patent: Feb. 25, 2020

(54) WIRELESS SIGNAL TRANSCEIVER DEVICE AND POWER-SAVING CONTROL METHOD OF THE SAME

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Chiang-Wen Lai, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 129 days.

(21) Appl. No.: 15/861,295

(22) Filed: Jan. 3, 2018

(65) Prior Publication Data
US 2018/0376421 A1 Dec. 27, 2018

(30) Foreign Application Priority Data
Jun. 27, 2017 (TW) .............................. 106121430 A

(51) Int. Cl.
*H04W 52/02* (2009.01)
*H04B 1/38* (2015.01)
(Continued)

(52) U.S. Cl.
CPC .......... *H04W 52/0235* (2013.01); *H04B 1/38* (2013.01); *H04B 1/40* (2013.01); *H04W 76/28* (2018.02)

(58) Field of Classification Search
None
See application file for complete search history.

(56) References Cited

U.S. PATENT DOCUMENTS

2004/0077383 A1* 4/2004 Lappetelainen .. H04W 52/0229
 455/574
2004/0178955 A1* 9/2004 Menache ................. A63F 13/06
 342/463
(Continued)

FOREIGN PATENT DOCUMENTS

CN 102904595 B 2/2015
CN 105307251 A 2/2016

OTHER PUBLICATIONS

Examination Report for TW106121430, dated Aug. 29, 2018, Total of 7 pages.
(Continued)

*Primary Examiner* — Alex Skripnikov
*Assistant Examiner* — Sharmin Chowdhury
(74) *Attorney, Agent, or Firm* — R. Lynette Wylle; Apex Jurls, pllc.

(57) ABSTRACT

A wireless signal transceiver device including an RF transceiver, a microcontroller, and a wake-up module is disclosed. Wherein, the microcontroller is electrically connected to the RF transceiver, and the wake-up module is electrically connected to the microcontroller. The power-saving control method for the wireless signal transceiver device includes making the RF transceiver to operate in the first sleeping mode, waiting to receive an RF wires signal, and determining whether there is a triggering signal included in the RF wireless signal or not; if not, returning to step B, and if yes, sending out a wake-up signal to the microcontroller according to the triggering signal so as to enable the microcontroller to control the RF transceiver to change from the first sleeping mode to the first operation mode. Whereby, it is favorable to prevent the RF transceiver from consuming electric power continuously so as to save power.

7 Claims, 4 Drawing Sheets

(51) Int. Cl.
    *H04W 76/28*        (2018.01)
    *H04B 1/40*         (2015.01)

(56)           References Cited

U.S. PATENT DOCUMENTS

2005/0191966 A1*  9/2005  Katsuta ................... H04B 1/30
                                                    455/68
2011/0006824 A1*  1/2011  Kang ................ H04W 52/0229
                                                    327/175
2012/0185717 A1*  7/2012  Song ................ H04W 52/0251
                                                    713/323
2016/0007288 A1*  1/2016  Samardzija ....... H04W 52/0229
                                                    370/311
2017/0346335 A1*  11/2017 Chen ...................... H02J 9/061

OTHER PUBLICATIONS

Search Report for TW106121430, dated Aug. 29, 2018, Total of 1 page.
English Abstract for CN102904595, Total of 1 page.
English Abstract for CN105307251, Total of 1 page.

\* cited by examiner

WIRELESS SIGNAL TRANSCEIVER DEVICE AND POWER-SAVING CONTROL METHOD OF THE SAME

BACKGROUND OF THE INVENTION

1. Technical Field

The present invention is related to remote control, and more particularly related to a wireless signal transceiver device which could reduce power consumption and a power-saving control method thereof.

2. Description of Related Art

Conventional home appliances are usually equipped with a control device which enables a user to adjust and control the operation of the home appliances manually. However, when the user wants to adjust or turn on/off the home appliances, the user has to go near to the home appliances to adjust or turn on/off the home appliances, which could easily cause an inconvenience on the user.

Therefore, in order to solve the above problems, a remote controller and an RF control module connected to the remote controller have been developed, wherein the remote controller is adapted to generate an RF wireless signal which includes a control signal, and the RF control module is adapted to control the control device according to the control signal included in the RF wireless signal after receiving the RF wireless signal, and thereby to adjust or turn on/off the home appliances.

The conventional RF control module usually includes an RF transceiver which is adapted to receive and transmit an RF wireless signal and to perform signal conversion between RF wireless signals and electric signals. In order to enable the user to control the home appliances via the remote controller at any time, it is necessary to keep the RF transceiver in the working status such that the RF transceiver could receive the RF signal transmitted from the remote controller.

However, the RF transceiver would consume a predetermined amount of power in order to be kept in the working status even the RF transceiver does not receive any RF wireless signal. Especially in the case of limited power, such as a battery is used as a power supply, if the power consumption of the RF transceiver could be reduced, it would be favorable to extend the usage time of the battery.

BRIEF SUMMARY OF THE INVENTION

In view of the above, an object of the present invention is to provide a wireless signal transceiver device and a power-saving control method of the same, which could reduce power consumption.

The present invention provides a wireless signal transceiver device which includes an RF transceiver, a microcontroller, and a wake-up module. The RF transceiver electrically connected to an antenna and adapted to operate in a first operation mode or a first sleeping mode, wherein in the first operation mode, the RF transceiver is adapted to perform signal conversion between RF signals and electric signals, and in the first sleeping mode, the RF transceiver stops performing the signal conversion between the RF wireless signals and the electric signals. The microcontroller is electrically connected to the RF transceiver and adapted to receive the electric signals transmitted from the RF transceiver or to send the electric signals to the RF transceiver, and to control the RF transceiver to change from the first sleeping mode to the first operation mode according to a received wake-up signal. The wake-up module is electrically connected to the antenna and adapted to receive the RF wireless signal which includes a trigger signal via the antenna, wherein the trigger signal would be converted to the wake-up signal by the wake-up module; the wake-up module has a power consumption which is smaller than those of the RF transceiver and the microcontroller.

The present invention also provides a power-saving control method which includes the following steps.

A. making the RF transceiver to operate in the first sleeping mode;

B. waiting to receive an RF wires signal;

C. determining whether there is a triggering signal included in the RF wireless signal or not;

if not, returning to step B;

if yes, sending out a wake-up signal to the microcontroller according to the triggering signal so as to enable the microcontroller to control the RF transceiver to change from the first sleeping mode to the first operation mode.

The advantage of the present invention is that by utilizing the wake-up module which has a smaller power consumption to generate a wake-up signal to wake up the RF transceiver which has a greater power consumption, it could prevent the RF transceiver from continuously consuming the electric energy so as to save the power.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
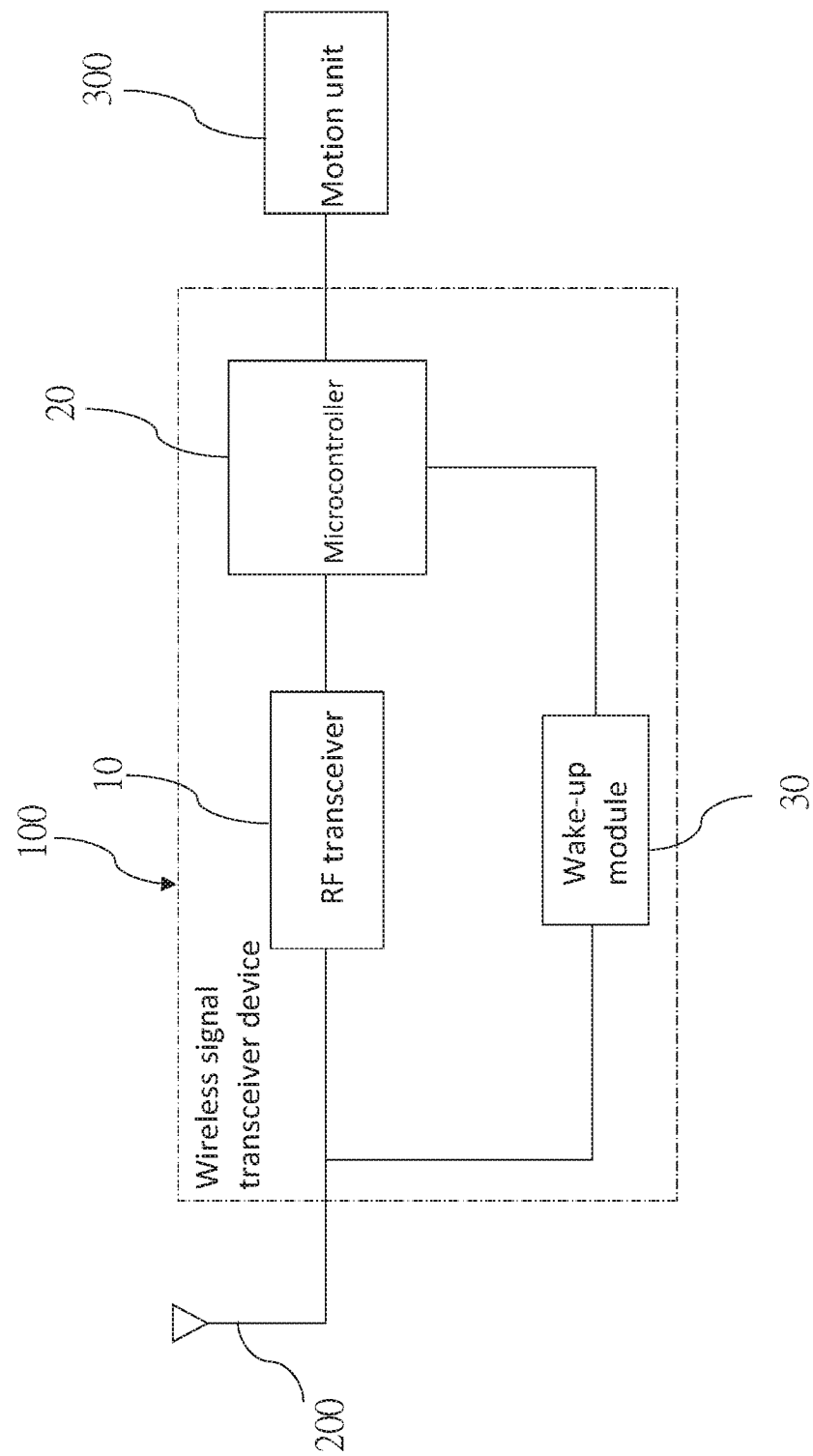
FIG. 1 is a block diagram of a wireless signal transceiver device of an embodiment according to the present invention.
Figure 2:
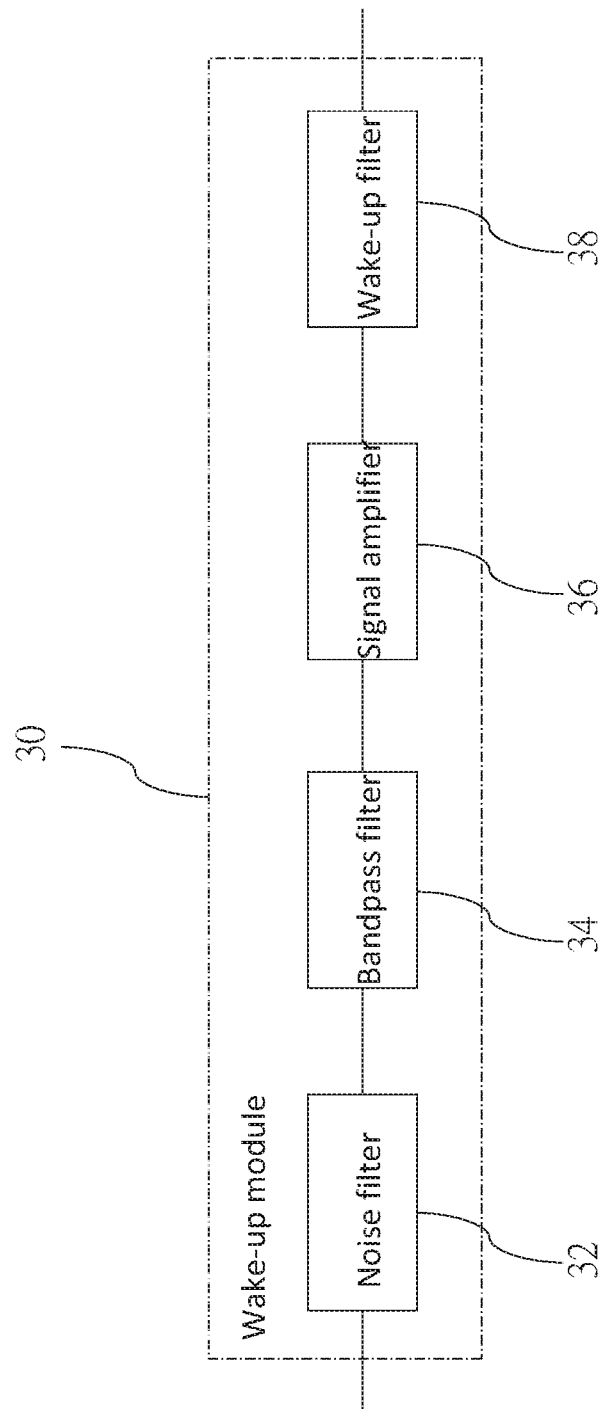
FIG. 2 is block diagram of a wake-up module of the wireless signal transceiver device of the embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1 and FIG. 2, a wireless signal transceiver device 100 of an embodiment according to the present invention is illustrated. The wireless signal transceiver device 100 is adapted to remotely control home appliances. The wireless signal transceiver device 100 is electrically connected to an antenna 200, a motion unit 300 and a power supply (not shown). The antenna 200 is adapted to receive wireless signals, while the motion unit 300 would operate in response to a control signal contained in the wireless signal. Depending on the different types of the home appliances, the motion unit 300 can be a refrigerator, a heater, an electric heater, or a burner. In this embodiment, a central operating frequency of the RF wireless signal is 443 MHz or 315 MHz. The wireless signal transceiver device 100 includes an RF transceiver 10, a microcontroller 20 and a wake-up module 30.

Wherein, in this embodiment, the RF transceiver 10 is a radio frequency integrated circuit (RFIC). The RF transceiver 10 is electrically connected to an antenna 200 and can operate in a first operation mode or a first sleep mode. In the first operation mode, the RF transceiver 10 is adapted to perform signal conversion between RF wireless signals and electrical signals. That is, when the antenna 200 receives RF wireless signals, the RF wireless signals would be converted into electrical signals via the RF transceiver 10. Meanwhile, electrical signals can be converted into RF wireless signals by the RF transceiver 10 and then transmitted via the antenna 200. In the first operation mode, the RF transceiver 10 has a first power consumption. On the contrary, in the first sleep mode, the RF transceiver 10 stop performing the signal conversion between RF wireless signals and electrical signals and has a power consumption smaller than the first power consumption. In this embodiment, the RF transceiver 10 includes a sleeping-control circuit (not shown) which is built therein. When the RF transceiver 10 is idle for a period of time, the RF transceiver 10 would enter into the first sleep mode automatically. In the first sleep mode, if the RF transceiver 10 receives an external triggering signal, the RF transceiver 10 would change into the first operation mode again.

The microcontroller 20 is electrically connected to the RF transceiver 10 and the motion unit 300. The microcontroller 20 is adapted to receive the electrical signals from the RF transceiver 10 to control an operation of the motion unit 300, and to transmit corresponding electrical signals to the RF transceiver 10 depending on a state of the motion unit 300 so as to convert and transmit the electrical signals into RF wireless signals. In addition, the microcontroller 20 can control the RF transceiver 10 to change from the first sleep mode to the first operation mode according to a wake-up signal received by a wake-up pin included therein. In this embodiment, the microcontroller 20 can operate in a second operation mode or a second sleep mode. In the second operation mode, the microcontroller 20 operates as mentioned above, and has a second power consumption, wherein the second power consumption is smaller than the first power consumption. In the second sleep mode, the microcontroller 20 is adapted to receive a wake-up signal and does not operate as the second operation mode. Upon receiving the wake-up signal, the microcontroller 20 would change from the second sleep mode to the second operation mode. The microcontroller 20 includes a sleeping-control circuit (not shown) which is built therein. When the microcontroller 20 is idle for a period of time, the microcontroller 20 would enter into the second sleep mode. In this embodiment, the microcontroller 20 is waked up with an inverted pulse. That is, when the pulse is at a high voltage, the microcontroller 20 remains in the second sleep mode; on the other hand, when the pulse is inverted to a low voltage for a period of time, the microcontroller 20 would switch to the second operation mode. In this way, when the wake-up pin of the microcontroller 20 receives a positive pulse resulting from an external noise signal, the positive pulse would not be recognized as a wake-up signal by the microcontroller 20.

The wake-up module 30 is electrically connected with the antenna 200 and adapted to receive an RF wireless signal which includes a triggering signal via the antenna 200 and to convert the RF wireless signal into the wake-up signal. The wake-up module 30 includes a third power consumption. Wherein, the third power consumption is smaller than the first power consumption and the second power consumption. Preferably, the third power consumption is smaller than one-tenth of the second power consumption. In this embodiment, the wake-up module 30 includes a noise filter 32, a bandpass filter 34, a signal amplifier 36 and a wake-up filter 38 which are electrically connected in series. Wherein, the noise filter 32 is electrically connected to the antenna 200 and adapted to remove high-frequency noises from the electric signals which are transmitted from the antenna 200 and to be output. Since a radio wave usually contains wireless signals of a variety of frequency bands, such as the wireless signals of 2.4 GHz/5 GHz frequency band utilized in the wireless network, the radio wave can easily become noise signals and disturb the RF wireless signal. Therefore, the high-frequency noises could be filtered out with the noise filter 32. The bandpass filter 34 is adapted to receive and filter the electric signals from the noise filter 32 to remove part of the electric signals which are out of a working frequency band, and thereby output the electric signals of the working frequency band. After this step, the amplitude of the electric signals is smaller than 10 mV. Hence, the signal amplifier 36 is utilized to amplify the electric signals to have an amplitude greater than 30 mV and then to output the amplified electric signals. The wake-up filter 38 includes an integrator (not shown) adapted to accumulate the electric energy of the electric signals transmitted from the signal amplifier 36. After accumulating the electric energy for a predetermined period of time to achieve a predetermined voltage, the wake-up filter 38 would send out the wake-up signal. In this embodiment, the wake-up signal includes a pulse with a voltage variation of a high-voltage level, a low-voltage level, and a high-voltage level in a timing-sequence. That is, the wake-up signal is an inverted pulse.

Figure 3:
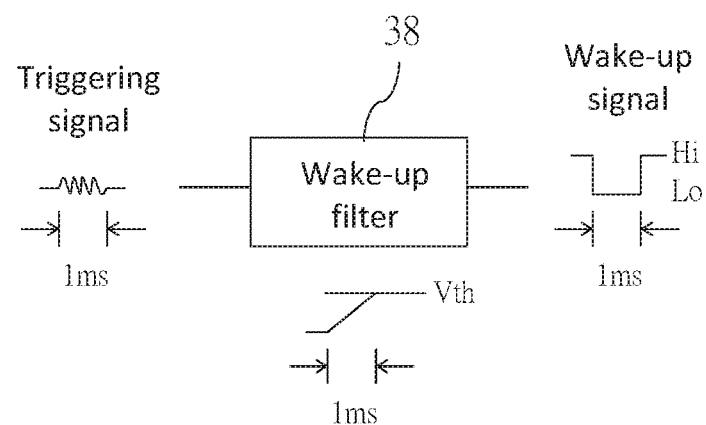
FIG. 3 is a schematic view showing that the wake-up filter accumulates the electric energy of the triggering signal and sends out the wake-up signal.
Figure 4:
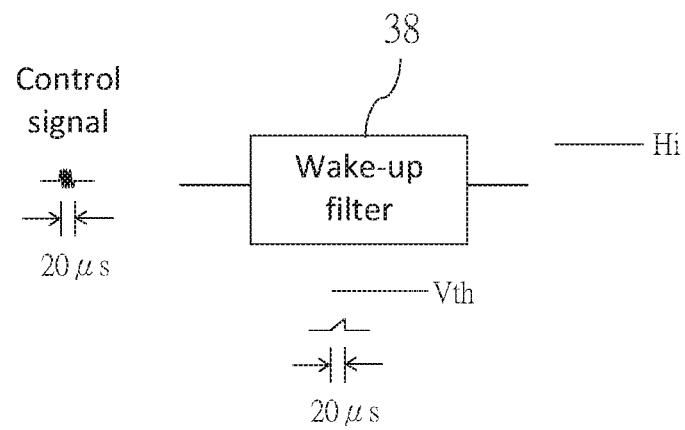
FIG. 4 is a schematic view showing that the wake-up filter accumulates the electric energy of the control signal and sends out a high-voltage level.

For example, referring to FIG. 3, when the wake-up filter 38 receives a triggering signal having a predetermined time of 1 m/s, the wake-up filter 38 would accumulate the electric energy continuously for the predetermined time, i.e., 1 m/s to achieve a predetermined voltage Vth, and then output a wake-up signal to switch the microcontroller 20 to the second operation mode. In this embodiment, the pulse of the wake-up signal remains at a low-voltage level Lo for the same time period, i.e., the predetermined time (1 m/s), but it is not limited thereto and could be adjusted depending on different requirements. Referring to FIG. 4, when the wake-up filter 38 receives a control signal (not a triggering signal) having a duration time which is much smaller than the predetermined time (1 m/s), the wake-up filter 38 would only accumulate the electric energy for 20 μs and the accumulated voltage could not reach to the predetermined voltage Vth. Therefore, the wake-up filter 38 would output a high-voltage pulse Hi, which makes the microcontroller 20 remain in the second sleep mode.

Figure 5:
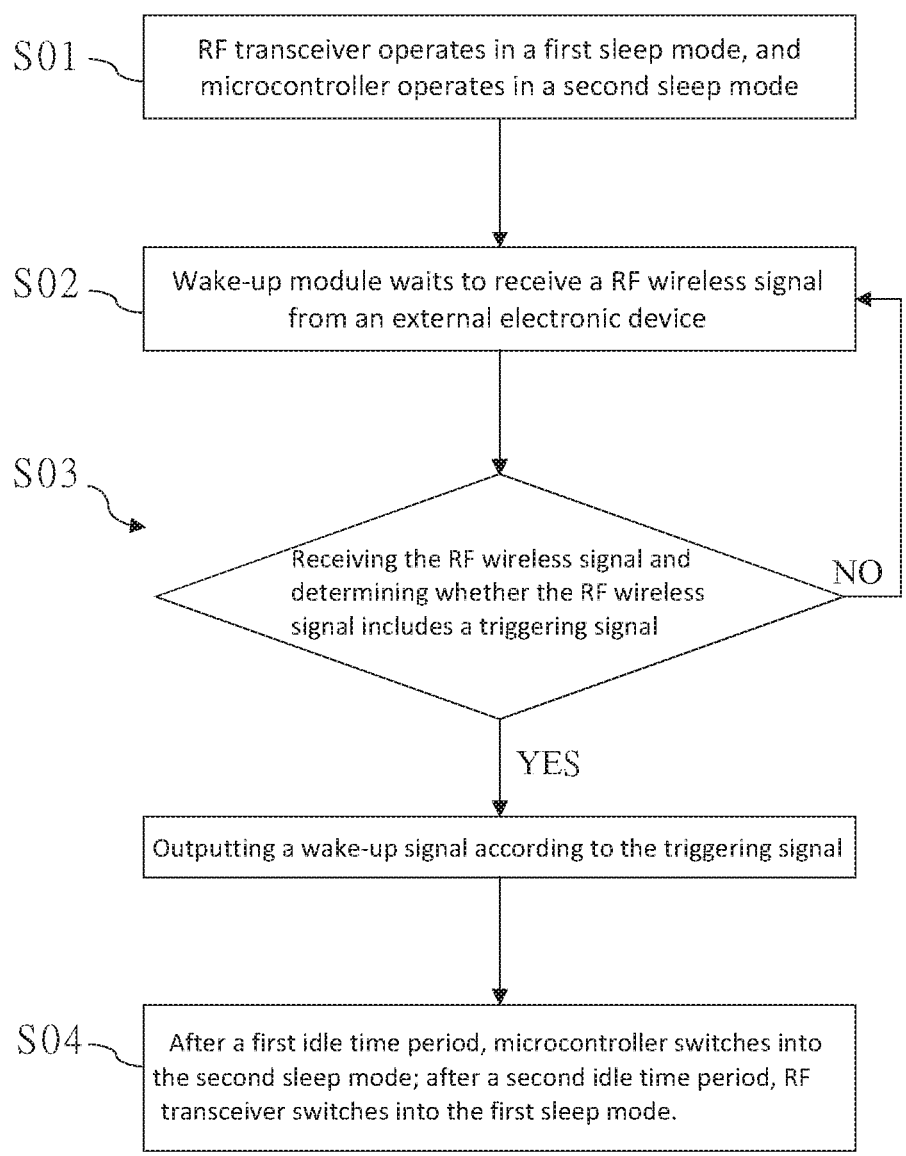
FIG. 5 is a flowchart of a power-saving control method for the wireless signal transceiver device of the embodiment according to the present invention.

Hereinafter, the power-saving control method for the wireless signal transceiver device 100 of the embodiment would be described in detail. As shown in FIG. 5, the power-saving control method includes the following steps.

In step S01, the RF transceiver 10 operates in the first sleep mode, and the microcontroller 20 operates in the second sleep mode. In this embodiment, the sleeping-control circuits of the RF transceiver 10 and the microcontroller 20 are set to make the RF transceiver 10 and the microcontroller 20 enter the first and the second sleeping mode respectively in advance.

In step S02, the wake-up module 30 waits to receive an RF wireless signal from an external electronic device. If the wake-up module 30 does not receive the RF wireless signal, the wireless signal transceiver device 100 remains in a power-saving status.

In step S03, the wake-up module 30 would determine whether there is a triggering signal included in the RF wireless signal or not after receiving the RF wireless signal.

If so, the wake-up signal is sent to the microcontroller 20 according to the triggering signal and the microcontroller 20 would control the RF transceiver 10 changes from the first sleeping mode to the first operation mode.

If not, then return to step S02 to wait for receiving the RF wireless signal.

In step S03 of this embodiment, the electric energy accumulated by the electric signal transformed from the RF wireless signal is used to determine whether there is a triggering signal or not. It is illustrated in FIG. 3 that the wake-up filter 38 is adapted to accumulate the electric energy of the electric signal and to send out a triggering signal when the accumulated voltage achieves the predetermined voltage Vth. Hence, it is necessary for the triggering signal included in the RF wireless signal which is sent from the electronic device to have a duration time over the predetermined time to enable the wake-up module 30 to accumulate the electric energy for the predetermined time, whereby the wake-up module 30 could determine that there is an included triggering signal and send out a wake-up signal. If it is not a triggering signal (as shown in FIG. 4), the wake-up module would continue to send out a high-voltage level Hi. That is, the received RF wireless signal is ignored.

After receiving the wake-up signal, the microcontroller 20 would change to the second operation mode and then control the RF transceiver 10 to change from the first sleeping mode to the first operation mode, wherein the microcontroller 20 is also adapted to receive electric signals from the RF transceiver or to send out electric signals to the RF transceiver 10.

Whereby, the home appliances could be normally operated via the wireless signal transceiver device 100 to receive and transmit corresponding control signals.

Furthermore, the method could further includes a step S04, wherein the microcontroller 20 could determine when a first idle time which the microcontroller 20 is waited to receive the electric signal from the RF transceiver 10 or waited to send the electric signal to the RF transceiver 10 is fulfilled via the sleeping control circuit, the microcontroller 20 would change to the second sleeping mode automatically. The RF transceiver 10 could determine when a second idle time which the RF transceiver 10 is waited to receive the RF wireless signal is fulfilled via the sleeping circuit, the RF transceiver would change to the first sleeping mode automatically, wherein the second idle time is greater than the first idle time. Whereby, the wireless signal transceiver device 100 would remain in the power-saving status again.

In practice, in step S04, when the microcontroller 20 enters the second sleeping mode but before the RF transceiver entering the first sleeping mode, the microcontroller 20 could change to the second operation mode if the electric signal is received from the RF transceiver.

In practice, the wireless signal transceiver device 100 and the power-saving control method thereof also could have a design that the microcontroller 20 would not enter the second sleeping and only the RF transceiver 10 would enter the first sleeping mode in the power-saving status.

In view of the above, by utilizing the wake-up module 20 which has a smaller power consumption to generate a wake-up signal to wake up the RF transceiver 10 which has a greater power consumption, the advantage of the wireless signal transceiver device 100 of the present invention is to prevent the RF transceiver 10 from continuously consuming the electric energy so as to save the power. Especially, when a battery cell is used as the power supply, it is favorable to extend the usage time of the battery cell.

It must be pointed out that the embodiments described above are only some embodiments of the present invention. All equivalent structures which employ the concepts disclosed in this specification and the appended claims should fall within the scope of the present invention.

It must be pointed out that the embodiments described above are only some embodiments of the present invention. All equivalent structures which employ the concepts disclosed in this specification and the appended claims should fall within the scope of the present invention.

What is claimed is:

1. A wireless signal transceiver device, adapted to be connected an antenna, comprising:

an RF transceiver, electrically connected to the antenna and being operated in a first operation mode or a first sleeping mode, wherein the RF transceiver is adapted to perform signal conversion between RF wireless signals and electric signals in the first operation mode, and the RF transceiver stops performing the signal conversion between the RF wireless signals and the electric signals in the first sleeping mode;

a microcontroller, electrically connected to the RF transceiver and adapted to receive the electric signals from the RF transceiver or to send electric signals to the RF transceiver, wherein the microcontroller would control the RF transceiver to change from the first sleeping mode to the first operation mode according to a wake-up signal included in received electric signals; and a wake-up module, electrically connected to the antenna and adapted to receive the RF wireless signal which includes a trigger signal via the antenna, wherein the trigger signal would be converted to the wake-up signal by the wake-up module; the wake-up module has a power consumption which is smaller than those of the RF transceiver and the microcontroller;

wherein the triggering signal would have a duration of a predetermined time; the wake-up module would continuously accumulate an electric energy of the electric signals transmitted from the antenna, and then send out the wake-up signal when the electric energy is accumulated for predetermined time; and wherein the wake-up signal includes a pulse with a voltage variation of a high-voltage level, a low-voltage level, and a high-voltage level in a timing-sequence; the microcontroller would control the RF transceiver to change from the first sleeping mode to the first operation mode when the microcontroller is at the low-voltage level.

2. The wireless signal transceiver device of claim 1, wherein a central operating frequency of the RF wireless signal is 443 MHz or 315 MHz; the wake-up module includes a noise filter, a bandpass filter, a signal amplifier, and a wake-up filter, wherein the noise filter is electrically connected to the antenna and adapted to remove high-frequency noises from the electric signals which are transmitted from the antenna and output the electric signals; the bandpass filter is adapted to remove part of the electric signals transmitted from the noise filter which are out of a working frequency band, and output the electric signals; the signal amplifier is adapted to amplify the electric signals transmitted from the bandpass filter and output the electric signals; the wake-up filter is adapted to accumulate the electric energy of the electric signals transmitted from the signal amplifier, and to output the wake-up signal when the electric energy is accumulated for the predetermined time.

3. The wireless signal transceiver device of claim 1, wherein the microcontroller could be operated in a second operation mode or a second sleeping mode; in the second sleeping mode, the microcontroller is adapted to receive the wake-up signal and would change to the second operation mode after receiving the wake-up signal; in the second operation mode, the microcontroller would control the RF transceiver to change from the first sleeping mode to the first operation mode, and be adapted to receive the electric signals transmitted from the RF transceiver or to send the electric signals to the RF transceiver.

4. A power-saving control method for a wireless signal transceiver device, wherein the wireless signal transceiver device includes an RF transceiver and a microcontroller; the RF transceiver is adapted to operate in a first operation mode or a first sleeping mode, wherein in the first operation mode, the RF transceiver is adapted to perform signal conversion between RF signals and electric signals, and in the first sleeping mode, the RF transceiver stops performing the signal conversion between the RF wireless signals and the electric signals; the microcontroller is electrically connected to the RF transceiver and adapted to receive the electric signals transmitted from the RF transceiver or to send electric signals to the RF transceiver, and to control the RF transceiver to change from the first sleeping mode to the first operation mode according to a received wake-up signal; the power-saving control method comprising the steps of:
 A. making the RF transceiver to operate in the first sleeping mode;
 B. waiting to receive an RF wireless signal;
 C. determining whether there is a triggering signal included in the RF wireless signal or not; if not, returning to step B; if yes, sending out a wake-up signal to the microcontroller according to the triggering signal so as to enable the microcontroller to control the RF transceiver to change from the first sleeping mode to the first operation mode;

wherein the triggering signal has a duration for a predetermined time; in step C, the RF signal is converted to an electric signal and an electric energy of the electric signal is continuously accumulated; when the electric energy is accumulated for the predetermined time, the triggering signal is determined to be included in the electric signal and the wake-up signal is sent out;

wherein the wake-up signal includes a pulse with a voltage variation of a high-voltage level, a low-voltage level, and a high-voltage level in a timing-sequence; the microcontroller would control the RF transceiver to change from the first sleeping mode to the first operation mode when the microcontroller is at the low-voltage level.

5. The power-saving control method of claim 4, wherein the microcontroller could be operated in a second operation mode or a second sleeping mode; in the second sleeping mode, the microcontroller is adapted to receive the wake-up signal and would change to the second operation mode after receiving the wake-up signal; in the second operation mode, the microcontroller would control the RF transceiver to change from the first sleeping mode to the first operation mode, and be adapted to receive the electric signals transmitted from the RF transceiver or to send the electric signals to the RF transceiver; wherein, in step A, further including making the microcontroller to operate in the second sleeping mode; in step C, sending out the wake-up signal is to make the microcontroller to operate in the second operation mode.

6. The power-saving control method of claim 5, wherein after step C, the method further comprises a step of changing the microcontroller to the second sleeping mode when the microcontroller is waited but does not receive the electric signal from the RF transceiver or is waited but does not send the electric signal to the RF transceiver for a first idle time.

7. The power-saving control method of claim 6, wherein after step C, the method further comprises a step of changing the RF transceiver to the first sleeping mode when the RF transceiver is waited but does not receive the RF wireless signal for a second idle time, wherein the second idle time is greater than the first idle time.

* * * * *